G. C. PATE.
FERTILIZER DISTRIBUTER.
APPLICATION FILED JUNE 23, 1911.
1,020,571.
Patented Mar. 19, 1912.
2 SHEETS—SHEET 2.
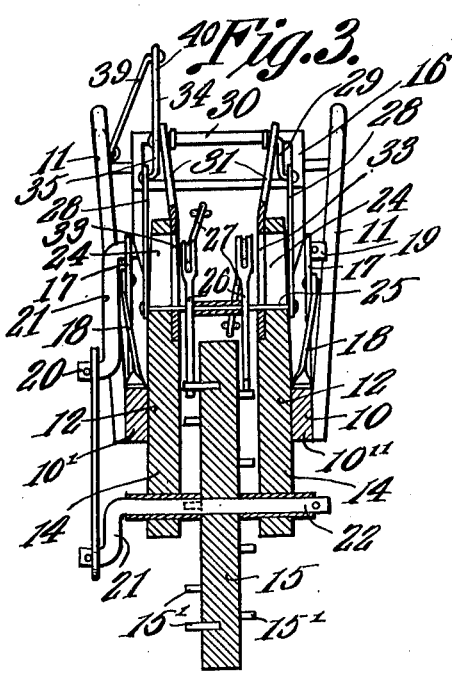
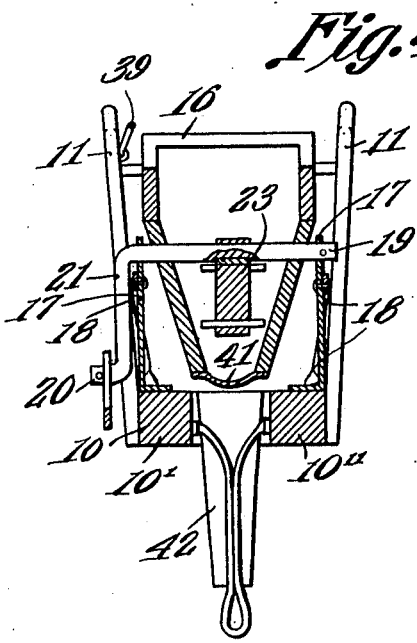
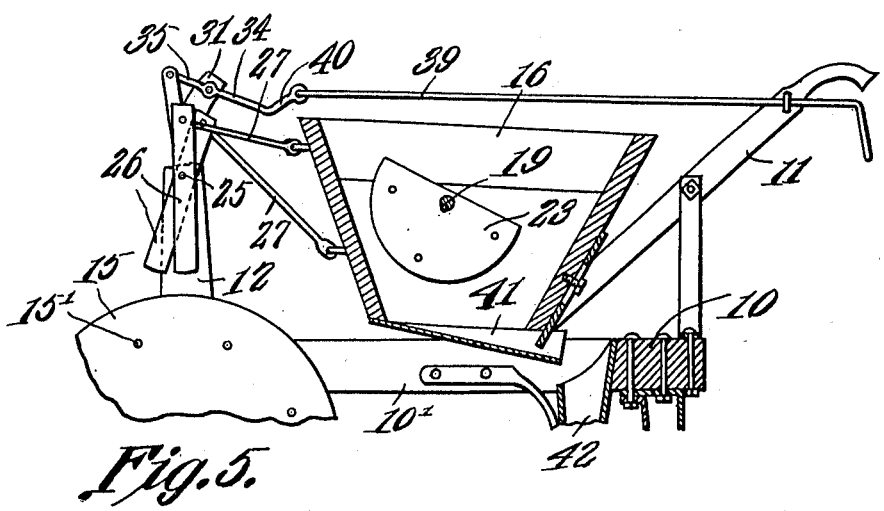
Witnesses
Grover C. Pate,
Inventor
by C. A. Snow & Co.
Attorneys

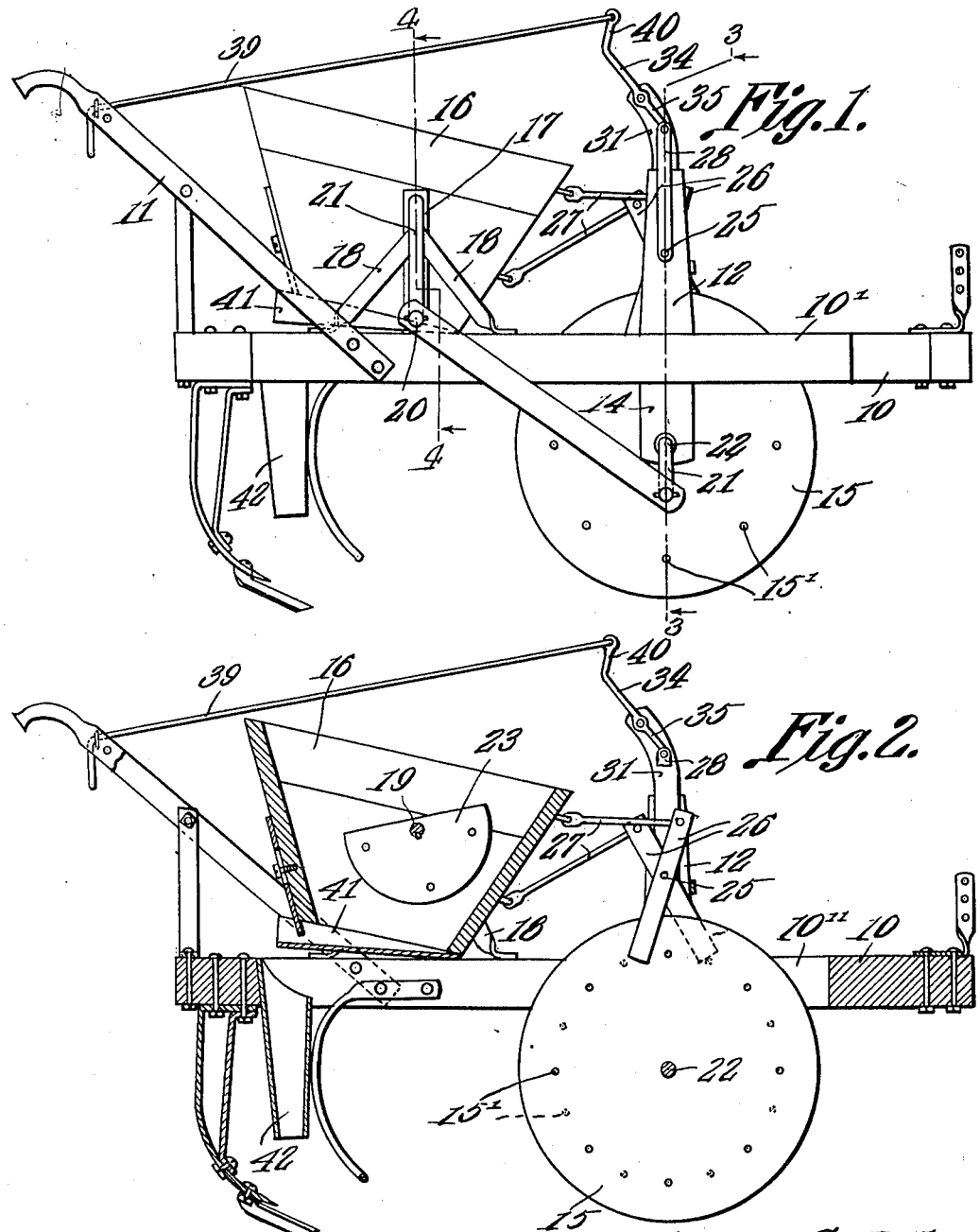

UNITED STATES PATENT OFFICE.

GROVER C. PATE, OF DAINGERFIELD, TEXAS.

FERTILIZER-DISTRIBUTER.

1,020,571.     Specification of Letters Patent.     Patented Mar. 19, 1912.

Application filed June 23, 1911. Serial No. 634,875.

*To all whom it may concern:*

Be it known that I, GROVER C. PATE, a citizen of the United States, residing at Daingerfield, in the county of Morris and State of Texas, have invented a new and useful Fertilizer-Distributer, of which the following is a specification.

This invention relates to an improvement in fertilizer distributers.

The primary object of the invention is to construct a distributing mechanism in which a rocking hopper is employed and provide the same with a simple and easily operated mechanism by means of which the distributer may be drawn across the ground without movement being imparted to the hopper.

A further object of this invention is to provide simple and efficient means for rocking the hopper and consonantly operating an agitating mechanism arranged within the same.

In the drawings:—Figure 1 is a side elevation of the distributer. Fig. 2 is a longitudinal sectional view. Fig. 3 is a section taken on the line 3—3 of Fig. 1. Fig. 4 is a section taken on the line 4—4 of Fig. 1. Fig. 5 is a sectional view showing the knockers arranged out of contact with the tappets on the drive wheel.

In the drawings, 10 designates the frame of the distributer which is provided with handles 11 and at a point adjacent the forward end are the vertical supports 12, the lower end 14 of which supports a drive wheel 15 which extends between the portions 10' and 10'' of the frame. A hopper 16 is supported for a rocking movement by uprights 17 which are secured to the frame 10 and which are braced by struts 18. The hopper 16 is supported on a shaft 19 which is free to oscillate independent of the hopper, the shaft 19 being continued beyond the supports 17 and offset to form a crank 20 which has a link connection with the offset end 21 of shaft 22 on which the wheel 15 is mounted, the rotation of wheel 15 thus rocking the shaft 19 and imparting movement to an agitator 23 arranged on said shaft within the hopper. Each of the standards 12 which are supported by the frame 10 are provided adjacent their upper ends with slots 24. A shaft 25 extends between said uprights, its end portions extending through said slots. Arranged on said shaft are a plurality of arms 26 which are connected to the hopper by means of links 27, one of the links 27 being secured adjacent the bottom of the hopper, the other being secured adjacent its top. The drive wheel 15 is provided with tappets 15' which are adapted to contact with the levers 26 which are pivotally supported by the shaft 25, actuating said levers to rock the hopper, both faces of the drive wheel 15 being provided with tappets, the tappets on one face being in staggered relation to the tappets on the other face, the levers thus being alternately operated as the distributer is propelled. The shaft 25 is supported by a plurality of links 28 which are connected to the offset end 29 of a shaft 30. This shaft 30 is supported by the standards 31 which are secured to the inner faces of the uprights 12, the standards 31 being formed with slots 33 which are in alinement with the slots formed in the uprights, the shaft 25 extending through the slots in the standards and the slots in the uprights.

Secured to the shaft 30 is a curved arm 34, the end 35 of which corresponds to the offset end 29 of the shaft which as before stated is connected by a link 27 to the shaft 25, the end portion of the curved lever 35 having a similar connection with said shaft. It will be noted by this construction that the shaft 30 may be rocked by means of the lever 35, the rocking of said shaft in one direction raising the shaft 25, a reverse motion of the shaft 30 allowing the shaft 25 to descend. In order that this rocking of the shaft 30 may be accomplished in a convenient manner a rod 39 is connected to the offset end 40 of the lever 35, this rod extending to a point adjacent one of the handles and being supported by said handle at a point where the same may be conveniently reciprocated to raise and lower the depending arms which contact with the tappets arranged on the drive wheel 15. It will be noted from this construction that the hopper rocking mechanism may be conveniently brought into and out of operation in a simple and convenient manner, thus the distribution of the material contained within the hopper may be stopped although the distributer is being propelled.

The discharge end of the hopper is provided with a deflecting plate 41 which extends beyond the rear wall of the hopper and which when the hopper is rocked on supporting shafts will distribute the material to a spout 42, suitable plows being positioned in advance and to the rear of said spout for properly mixing the material with the soil.

What is claimed is:—

1. In a fertilizer distributer, a rocking hopper, a drive wheel arranged to impart movement to said hopper, a shaft arranged above said drive wheel, a plurality of vertically extending supports, said supports being slotted to receive the end portions of said shaft, arms arranged on said shaft in the path of tappets positioned on said wheel, said arms having a link connection with said hopper and means for imparting vertical movement to said shaft to render said hopper inactive.

2. In a fertilizer distributer, a rocking hopper, a drive wheel for imparting movement to said hopper, a plurality of uprights, a shaft supported for vertical movement by said uprights, arms arranged on said shaft, said arms having a link connection with said hopper, a curved standard secured to each of said uprights, a shaft supported by said standards, a connection between said shaft and the first mentioned shaft and means for rotating the second mentioned shaft to impart vertical movement to the first mentioned shaft.

3. In a fertilizer distributer, a rocking hopper, means for imparting movement to said hopper, a plurality of vertically extending supports, a shaft supported for vertical movement by said supports, arms arranged on said shaft, said arms having a link connection with said hopper, a curved standard secured to each support, a shaft supported by said standards, a lever pivotally supported by said shaft, a link connection between said lever and the first mentioned shaft, and means for rocking the first mentioned shaft to impart vertical movement to the second mentioned shaft.

4. In a fertilizer distributer, a rocking hopper, a drive wheel for imparting movement to said hopper, a plurality of vertically extending supports, said supports being slotted to receive the end portions of the shaft, an upright secured to each of said supports, said uprights being formed with slots in alinement with the first mentioned slots, a shaft supported by said uprights, a lever arranged to impart movement to said shaft, and a link connection between said lever and the first mentioned shaft whereby the first mentioned shaft may be vertically adjusted through the rocking of the second mentioned shaft.

In testimony that I claim the foregoing as my own, I have hereto affixed my signature in the presence of two witnesses.

GROVER C. PATE.

Witnesses:
A. T. HOOTON,
J. W. PATE.

---

Copies of this patent may be obtained for five cents each, by addressing the "Commissioner of Patents, Washington, D. C."